Jan. 15, 1957  G. F. COUCH  2,777,547
SLACK ADJUSTER
Filed Oct. 3, 1951  2 Sheets-Sheet 1

Inventor:
Glenn F. Couch
By *his Attorney*

Jan. 15, 1957  G. F. COUCH  2,777,547
SLACK ADJUSTER
Filed Oct. 3, 1951  2 Sheets-Sheet 2

Inventor:
Glenn F. Couch
By
his Attorney

2,777,547
SLACK ADJUSTER

Glenn F. Couch, Williamsville, N. Y., assignor to The Symington-Gould Corporation, Depew, N. Y., a corporation of Maryland Application October 3, 1951, Serial No. 249,499

7 Claims. (Cl. 188—198)

This invention relates to a slack adjuster adapted to automatically take up the slack caused by brake shoe wear on a railway car.

The principal object of the invention, generally stated, is to provide an automatic slack adjuster which is directly connected to the piston of the air brake system and is movable therewith, and to provide this slack adjuster with means for automatically adjusting the movement of the portion thereof which is connected to the brake rods to compensate for wheel or brake shoe wear.

Another object of the invention is to provide in a slack adjuster of the type described, means for restoring the parts of the slack adjuster to normal position when the wheels and brake shoes are likewise restored to their normal condition.

Other objects and advantages of the invention will more fully appear hereinafter in connection with the description of the invention taken with the illustration of a single embodiment of the invention shown on the accompanying drawings wherein like parts are designated by like reference characters.

Figure 1:
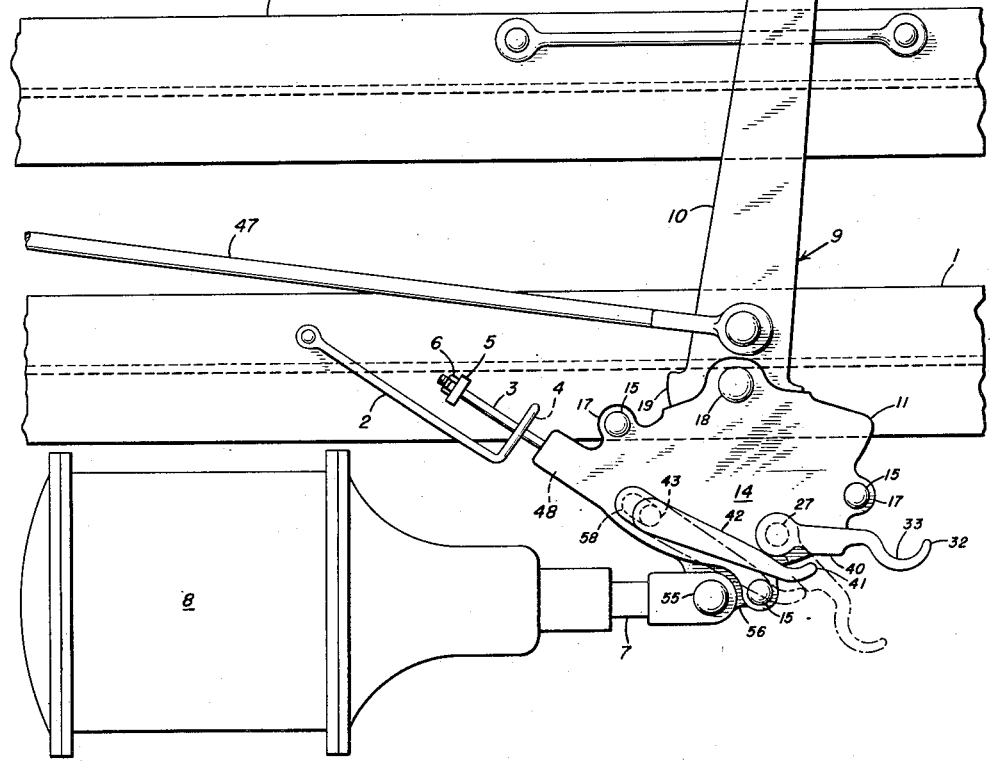
Figure 1 is a bottom plan view showing the slack adjuster in position and conected both to the brake cylinder and to the underframe.
Figure 3:
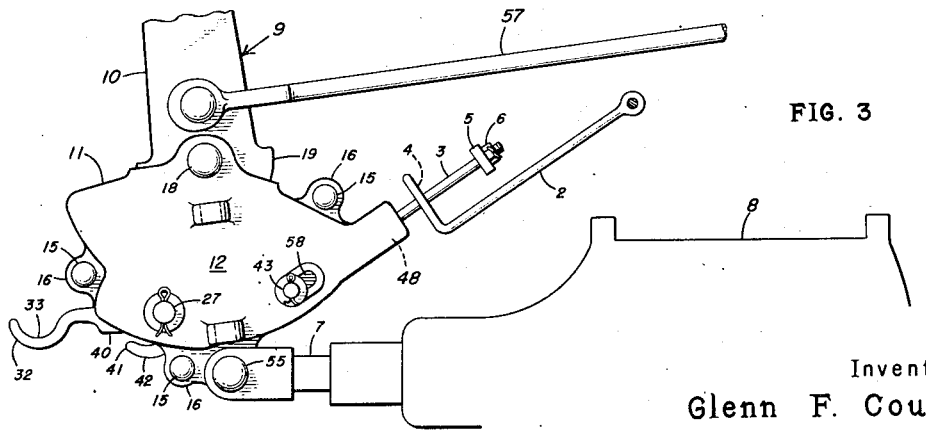
Figure 3 is a plan view in reverse from that illustrated in Figure 1, the parts of the car underframe being omitted.

The car sills illustrated in Figure 1 are designated by reference character 1. Connected to one of the sills is a bracket 2 through which the end of the bolt 3 of the slack adjuster is adapted to extend, the bracket 2 having an enlarged slotted opening 4 so that the movement of the bolt 3 transversely of the bracket 2 will be permitted, the washer 5 and the nut 6 limiting the extent of movement of the bolt 3 in one direction. Preferably the spacing between the slotted end 4 of the bracket 2 and the washer 5 is sufficient to permit full pressure piston rod travel of the piston 7 of the brake cylinder 8 before the washer engages a portion of the bracket.

Figure 4:
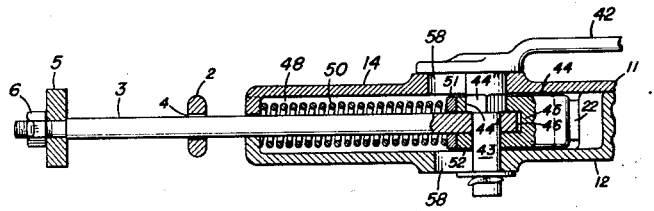
Figure 4 is a sectional view on line 4—4 of Figure 2, certain portions being shown in full lines, the direction of view being indicated by the arrows adjacent the ends of the section line.
Figure 5:
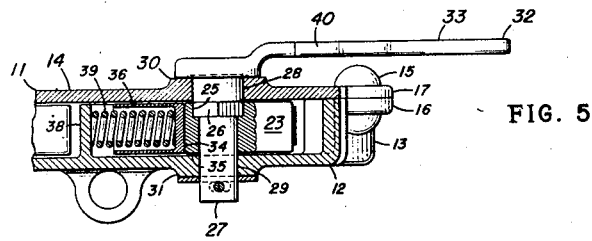
Figure 5 is a corresponding sectional view taken on line 5—5 of Figure 2, the direction of view being indicated by the arrows adjacent the ends of the section line.

The slack adjuster 9 comprises an arm or lever 10 and a housing member 11, the latter being U-shaped in section, as clearly indicated in Figure 4, having a base portion 12, an upstanding flange 13 and a cover plate 14, the cover plate being secured to the portion 12 by the three bolts 15 passing through the upstanding ears 16 on the base portion 12 and the corresponding ears 17 formed on the cover plate 14. The housing member 11 is pivotally connected to the arm 10 by means of a bolt 18 and the arm 10 is provided at its inner end with the cylindrical portion 19 terminating in a fan-shaped portion 20 which has formed on its peripheral edge 21 a series of ratchet teeth 22. Interposed between the peripheral edge 21 and the adjacent portion of the flange 13 is a pivoted dog 23 which is formed at its outer end with a plurality of teeth 24 adapted to normally engage the teeth 22 of the fan-shaped portion 20 of the arm 10. This dog is provided with a rectangular opening 25 to receive the correspondingly formed portion 26 of the pivotal member 27, the latter extending through openings 28 and 29 in the bosses 30 and 31 formed in the cover plate 14 and the base portion or wall 12, respectively.

Rigidly connected to the pivoted member 27 is an arm 32 which extends outwardly of the casing and is provided with a hook shaped portion 33 to form a hand-hold for the operation of this bar or lever. Bearing against the flattened portion 34 of the hub 35 of the pivoted member 27 is a spring pressed plunger 36 seated in a suitably formed recess 37 in the hollow head housing, or housing member 11. Interposed between a flange 38, defining the inner end of the recess 37, and the plunger 36 is a spring 39 which causes the plunger 36 to resist a turning movement of the dog 23. The arm or lever 32 is provided intermediate its ends with a flattened portion 40 adapted on the movement of the lever 32 in a clockwise direction to engage a second end 41 of the lever 42, the latter being rigidly connected to the pivoted member 43 of a second dog 44. The member 43 is provided with a recess 44' to engage the squared portions 44" of the dog 44. The dog 44 is bifurcated as indicated at 45 to receive the flattened end 46 of the bolt 3, the latter beyond the dog, projecting through a socketed portion 48 of the flange 13. Interposed between the dog 44 and the inner wall 49 of the socketed portion 48 and splined on the bolt 3 is a spring 50, the washer 51 of which, bearing against the hub 52 of the dog 44, maintains the toothed end 53 of the dog in engagement between the two adjacent teeth 22 of the arm 10.

Figure 2:
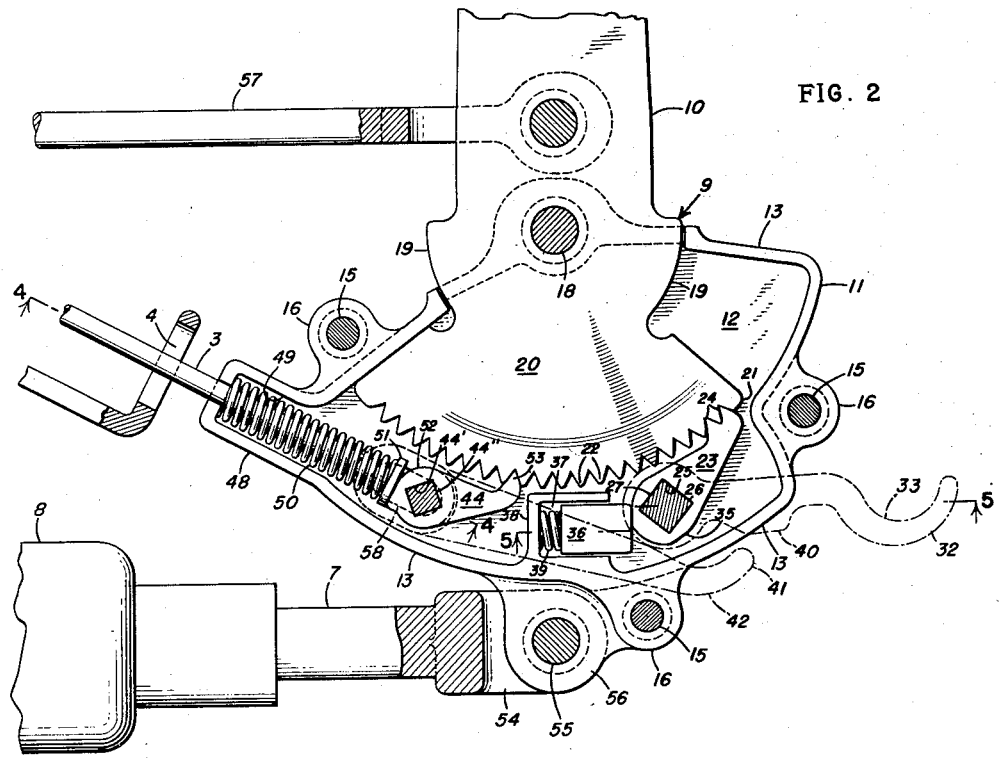
Figure 2 is an enlarged view partially in plan and partially in section showing the device with the cover plate removed and parts thereof additionally in fragmented section.

The piston rod 7 of the air cylinder 8 is bifurcated at its ends as shown in Figure 2 at 54 and is pivotally connected by the bolt 55 to the ear 56 formed on the outer face of the flange 13, the member 11 thus floating between and being pivotally connected to the piston rod and the lever 10. Pivotally connected to the arm 10 are rods 47 and 57 by which the movement of the piston rod 7 is transmitted to the brake system of the car trucks.

The operation of the device it is believed will be clear from the foregoing description. On the movement of the brake cylinder, as shown in Figure 2, the inner wall of the flange 13 causes the casing 11 and the arm 10 to move together and upon the return of the piston rod 7 to normal position the parts are maintained in this position so long as no slack is developed. If, however, due to the wear of the wheels or the brake shoes, a greater movement is required than the distance between the bracket 4 and the washer 5, the pivoted member 43 will move rearwardly in the slot 58 formed in the plate 12 and in the cover plate 14, causing the tooth 53 to move over the adjoining teeth until the limit of movement of the member 43 is reached, at which point the tooth 53 will again engage between two adjacent teeth 22 of the fan-shaped portion 20. On the return movement the spring 50 will maintain the dog 44 in position and will prevent the return of the arm 10 to the position illustrated in Figure 2. The casing will then move on the pivot 18 causing the dog 23 to move over the adjacent teeth 22 until the spacing between the two dogs is the same as that illustrated in Figure 2. This will force the casing out of contact with the fan-shaped portion 20 of the arm or lever 10 and consequently, take up the necessary slack to cause on the movement of the piston rod 7 a full brake application. This adjustment of the relative position between the head 11 and the lever 10 will continue until the limit of movement is reached by the right-hand end of the fan-shaped portion, engaging the adjacent portion of the flange 13, the range of movement being more than ample to provide for the total wear of the brake shoe and the further wear of the wheel surface. When the wear of the brake shoes has become sufficient to require replacement, the head will have assumed a position beyond that illustrated in Figure 2. When the shoes are replaced, the parts of the slack adjuster can be returned to normal position by the trainmen engaging the hand-hold 33, rotating the dog 23 and, by the engagement of the end 41 of the lever 42 with the projection 40, moving the dog 44 out of engagement with the teeth 22, whereupon the head 11 can be swung or restored to the position shown in Figure 2 and is again prepared to take up slack which may accumulate from time to time.

Having described my invention, what I claim and desire to secure by Letters Patent is:

1. In a slack adjuster for railway cars, the combination with a car underframe, an air cylinder connected thereto, a piston rod movable in said cylinder, and brake actuating rods, of a lever member to which said actuating rods are pivotally connected, a member floating between and pivoted to said piston rod and lever member, and means carried by one of said members, said means being engageable with said other member and reacting against means connected to said underframe for adjustably changing the angular relation between said members and maintaining a constant relation in movement between said brake and piston rods to compensate for wear.

2. In a slack adjuster for railway cars, the combination with a car underframe, a brake cylinder rigidly connected thereto, a piston rod movably positioned in said cylinder, a lever, and brake actuating rods pivotally connected to said lever, of a hollow member floating between and pivotally connected to said piston rod and lever, and means within and carried by said hollow member and adapted to engage a portion of said lever, said means reacting against means connected to said underframe to adjustably maintain a fixed relation in movement between said lever and brake rods to compensate for wear.

3. In a slack adjuster for railway cars, the combination with a car underframe, an air cylinder connected thereto, a piston rod movable in said cylinder and brake actuating rods, of a lever member to which said brake rods are pivotally connected, a member floating between and pivoted to said piston rod and lever member means carried by one of said members and engageable with said other member for drivably connecting said members in a plurality of angular settings, and means connected to said underframe and operative to cause said carried means and therethrough said members to change in position relative to each other on development of a predetermined slack in said brake actuating rods.

4. In a slack adjuster for railway cars, the combination with a car underframe, an air cylinder connected thereto, a piston rod movable in said cylinder and brake actuating rods, of a member pivoted to said piston rod, a lever having a ratcheted end pivoted to said member, said brake rods being pivotally connected to said lever, a pair of dogs carried by said member and engageable with said ratcheted end for drivably connecting said member and lever in a plurality of angular settings, and means connected to one of said dogs and restrainable in movement relative to said underframe on development of a predetermined slack in said brake rods for causing said dogs and therethrough said member to adjust in setting relative to said lever.

5. In a slack adjuster for railway cars, the combination with a car underframe, an air cylinder connected thereto, a piston rod movable in said cylinder and brake rods, of a member pivoted to said piston rod, a lever having a ratcheted end pivoted to said member, said brake rods being pivotally connected to said lever, a pair of spring loaded dogs carried by said member and engageable with said ratcheted end for drivably connecting said member and lever in a plurality of angular settings, and a lost motion connection between one of said dogs and said underframe for causing said dogs and therethrough said member to change in setting relative to said member to take up slack in the movement of said brake rods.

6. In a slack adjuster for railway cars, the combination with a car underframe, an air cylinder connected thereto, a piston rod movable in said cylinder and brake rods, of a lever having a ratcheted end, a member floating between and pivoted to said piston rod and ratcheted end of said lever, said brake rods being pivotally connected to said lever, dog means carried by said member and engageable with said ratcheted end for drivably connecting said member and lever in a plurality of angular settings, and means on said member and connected to said dog means for releasing said dog means and restoring said member and lever to their initial angular setting.

7. In a slack adjuster for railway cars, the combination with a car underframe, an air cylinder connected thereto, a piston rod movable in said cylinder and brake rods, of a member pivoted to said piston rod, a lever having a ratcheted end pivoted to said member, said brake rods being pivotally connected to said lever, a pair of spring loaded dogs carried by said member and engageable with said ratcheted end for drivably connecting said member and lever in a plurality of angular settings, a lost motion connection between one of said dogs and said underframe for causing said dogs and therethrough said member to change in setting relative to said member to take up slack in the movement of said brake rods, and manually operable means connected to said dogs for releasing said dogs and restoring said member and lever to their initial angular setting.

References Cited in the file of this patent

UNITED STATES PATENTS

| | | |
|---|---|---|
| 517,088 | Winters | Mar. 27, 1894 |
| 599,662 | Shaw | Feb. 22, 1898 |
| 1,017,504 | Bowles | Feb. 13, 1912 |
| 1,294,424 | Dearborn | Feb. 18, 1919 |
| 2,429,693 | Kelley | Oct. 28, 1947 |

FOREIGN PATENTS

| | | |
|---|---|---|
| 28,491 | Austria | May 25, 1907 |
| 39,654 | Austria | Nov. 10, 1909 |
| 10,794 | Great Britain | May 7, 1913 |